US010088173B2

(12) United States Patent
McKee et al.

(10) Patent No.: US 10,088,173 B2
(45) Date of Patent: *Oct. 2, 2018

(54) LOW-PROFILE MULTI-ZONE OVEN

(71) Applicant: ALTO-SHAAM, INC., Menomonee Falls, WI (US)

(72) Inventors: Philip R. McKee, Frisco, TX (US); Lee Thomas VanLanen, McKinney, TX (US); Todd Coleman, Farmers Branch, TX (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 65 days.

This patent is subject to a terminal disclaimer.

(21) Appl. No.: 15/426,620

(22) Filed: Feb. 7, 2017

(65) Prior Publication Data

US 2017/0211819 A1 Jul. 27, 2017

Related U.S. Application Data

(63) Continuation of application No. 14/733,533, filed on Jun. 8, 2015, now Pat. No. 9,677,774, and a continuation of application No. 15/016,093, filed on Feb. 4, 2016, now Pat. No. 9,879,865, which is a continuation-in-part of application No. 14/733,533, filed on Jun. 8, 2015, now Pat. No. 9,677,774, application No. 15/426,620, which is a continuation-in-part of application No. 15/094,645, filed on Apr. 8, 2016, which is a continuation-in-part of application No. 15/016,093, filed on Feb. 4, 2016, now Pat. No. 9,879,865, and a continuation-in-part of application No. 14/733,533, filed on Jun. 8, 2015, now Pat. No. 9,677,774, application No. 15/426,620, (Continued)

(51) Int. Cl.
| F24C 15/32 | (2006.01) |
|---|---|
| F24C 15/00 | (2006.01) |
| A21B 1/26 | (2006.01) |
| F24C 15/16 | (2006.01) |

(52) U.S. Cl.
CPC .............. *F24C 15/322* (2013.01); *A21B 1/26* (2013.01); *F24C 15/007* (2013.01); *F24C 15/16* (2013.01); *F24C 15/166* (2013.01); *F24C 15/00* (2013.01); *F24C 15/32* (2013.01)

(58) Field of Classification Search
CPC ......... F24C 15/32; F24C 15/007; F24C 15/16
USPC ............ 126/21 A, 21 R, 19 A; 219/400, 403
See application file for complete search history.

(56) References Cited

U.S. PATENT DOCUMENTS

| 1,527,020 A | 2/1925 | Valliant |
| 2,098,295 A | 11/1937 | Kettering et al. |
| 2,214,630 A | 9/1940 | Wheeler |

(Continued)

FOREIGN PATENT DOCUMENTS

| EP | 0002784 A1 | 7/1979 |
| EP | 1624255 A1 | 2/2006 |

(Continued)

*Primary Examiner* — Gregory Huson
*Assistant Examiner* — Nikhil Mashruwala
(74) *Attorney, Agent, or Firm* — Boyle Fredrickson S.C.

(57) ABSTRACT

A multi-zone, proximate-air oven using air delivered from the shelves provides a compact height through the use of low profile shelves. Intercavity heat leakage is managed by active insulation techniques making use of the oven feedback temperature control and controlled cavity loading.

27 Claims, 7 Drawing Sheets

Related U.S. Application Data which is a continuation-in-part of application No. 15/224,319, filed on Jul. 29, 2016.

(56) References Cited

U.S. PATENT DOCUMENTS

| | | |
|---|---|---|
| 2,305,056 A | 12/1942 | Austin |
| 2,491,687 A | 12/1949 | Nutt |
| 2,513,846 A | 7/1950 | Collins |
| 2,715,898 A | 8/1955 | Michaelis et al. |
| 2,940,381 A | 6/1960 | Cottongim et al. |
| 3,221,729 A * | 12/1965 | Harding, Jr. ............ A23L 3/365 126/21 A |
| 3,232,072 A | 2/1966 | Barroero |
| 3,304,406 A | 2/1967 | King |
| 3,326,201 A | 6/1967 | Murray |
| 3,335,499 A | 8/1967 | Larsson |
| 3,514,576 A | 5/1970 | Hilton et al. |
| 3,538,904 A | 11/1970 | Baker |
| 3,568,590 A | 3/1971 | Grice |
| 3,658,047 A | 4/1972 | Happel |
| 3,789,516 A | 2/1974 | Schraft et al. |
| 3,828,760 A | 8/1974 | Farber et al. |
| 3,884,213 A | 5/1975 | Smith |
| 3,908,533 A | 9/1975 | Fagerstrom et al. |
| 3,935,809 A | 2/1976 | Bauer |
| 3,946,651 A | 3/1976 | Garcia |
| 4,008,996 A * | 2/1977 | Wells ............... A47J 37/044 126/19 R |
| 4,038,968 A | 8/1977 | Rovell |
| 4,110,916 A | 9/1978 | Bemrose |
| 4,154,861 A | 5/1979 | Smith |
| 4,162,141 A | 7/1979 | West |
| 4,189,995 A | 2/1980 | Lehr et al. |
| 4,307,286 A | 12/1981 | Guibert |
| 4,307,659 A | 12/1981 | Martin et al. |
| 4,313,485 A | 2/1982 | Gidge et al. |
| 4,323,110 A | 4/1982 | Rubbright et al. |
| 4,326,342 A | 4/1982 | Schregenberger |
| 4,338,911 A | 7/1982 | Smith |
| 4,354,549 A | 10/1982 | Smith |
| 4,366,177 A | 12/1982 | Wells et al. |
| 4,374,319 A | 2/1983 | Guibert |
| 4,377,109 A | 3/1983 | Brown et al. |
| 4,381,442 A | 4/1983 | Guibert |
| 4,389,562 A | 6/1983 | Chaudoir |
| 4,395,233 A | 7/1983 | Smith et al. |
| 4,397,299 A | 8/1983 | Taylor et al. |
| 4,404,898 A | 9/1983 | Chaudoir |
| 4,455,478 A | 6/1984 | Guibert |
| 4,462,383 A | 7/1984 | Henke et al. |
| 4,471,750 A | 9/1984 | Burtea |
| 4,472,887 A | 9/1984 | Avedian et al. |
| 4,474,498 A | 10/1984 | Smith |
| 4,479,776 A | 10/1984 | Smith |
| 4,484,561 A | 11/1984 | Baggott et al. |
| 4,492,839 A | 1/1985 | Smith |
| 4,515,143 A | 5/1985 | Jabas |
| 4,516,012 A | 5/1985 | Smith et al. |
| 4,601,237 A | 7/1986 | Harter et al. |
| 4,605,038 A | 8/1986 | Tchitdjian |
| 4,625,867 A | 12/1986 | Guibert |
| 4,626,661 A | 12/1986 | Henke |
| 4,631,029 A | 12/1986 | Lanham et al. |
| 4,690,127 A | 9/1987 | Sank |
| 4,700,519 A | 10/1987 | Person et al. |
| 4,714,050 A | 12/1987 | Nichols |
| 4,722,683 A | 2/1988 | Royer |
| 4,727,853 A | 3/1988 | Stephen et al. |
| 4,739,154 A | 4/1988 | Bharara et al. |
| 4,750,276 A | 6/1988 | Smith et al. |
| 4,757,800 A | 7/1988 | Shei et al. |
| 4,822,981 A | 4/1989 | Chaudoir |
| 4,829,158 A | 5/1989 | Burnham |
| 4,829,982 A | 5/1989 | Abidor |
| 4,835,351 A | 5/1989 | Smith et al. |
| 4,865,864 A | 9/1989 | Rijsmck |
| 4,867,132 A | 9/1989 | Yencha |
| 4,870,254 A | 9/1989 | Arabori |
| 4,876,426 A | 10/1989 | Smith |
| 4,892,030 A | 1/1990 | Grieve |
| 4,895,137 A | 1/1990 | Jones et al. |
| 4,928,663 A | 5/1990 | Nevin et al. |
| 4,951,645 A | 8/1990 | Luebke et al. |
| 4,960,977 A | 10/1990 | Alden |
| 4,965,435 A | 10/1990 | Smith et al. |
| 4,981,416 A | 1/1991 | Nevin et al. |
| 4,994,181 A | 2/1991 | Mullaney, Jr. |
| 5,025,775 A | 6/1991 | Crisp |
| 5,050,578 A * | 9/1991 | Luebke ............... A21B 1/245 126/1 C |
| 5,121,737 A | 6/1992 | Yencha, III |
| 5,172,682 A | 12/1992 | Luebke et al. |
| 5,180,898 A | 1/1993 | Alden et al. |
| 5,211,106 A | 5/1993 | Lucke |
| 5,222,474 A | 6/1993 | Yencha, III |
| 5,223,290 A | 6/1993 | Alden |
| 5,228,385 A | 7/1993 | Friedrich et al. |
| 5,231,920 A | 8/1993 | Alden et al. |
| 5,254,823 A | 10/1993 | McKee et al. |
| 5,309,981 A | 5/1994 | Binder |
| 5,345,923 A | 9/1994 | Luebke et al. |
| 5,361,749 A | 11/1994 | Smith et al. |
| 5,365,039 A | 11/1994 | Chaudoir |
| 5,421,316 A | 6/1995 | Heber |
| 5,421,317 A | 6/1995 | Cole et al. |
| 5,434,390 A | 7/1995 | McKee et al. |
| 5,454,295 A | 10/1995 | Cox et al. |
| 5,458,051 A | 10/1995 | Alden et al. |
| 5,460,157 A | 10/1995 | Prabhu |
| 5,483,044 A | 1/1996 | Thorneywork et al. |
| 5,492,055 A | 2/1996 | Nevin et al. |
| 5,497,760 A | 3/1996 | Alden et al. |
| 5,507,382 A | 4/1996 | Hartwell et al. |
| 5,530,223 A | 6/1996 | Culzoni et al. |
| 5,558,793 A | 9/1996 | McKee et al. |
| 5,572,984 A | 11/1996 | Alden et al. |
| 5,577,438 A | 11/1996 | Amitrano et al. |
| 5,582,093 A | 12/1996 | Amitrano et al. |
| 5,620,731 A | 4/1997 | McKee |
| 5,647,740 A | 7/1997 | Kobaru |
| 5,655,511 A | 8/1997 | Prabhu et al. |
| 5,676,044 A | 10/1997 | Lara, Jr. |
| 5,683,240 A | 11/1997 | Smith et al. |
| 5,747,775 A | 5/1998 | Tsukamoto et al. |
| 5,847,365 A | 12/1998 | Harter et al. |
| 5,880,436 A | 3/1999 | Keogh |
| 5,908,574 A | 6/1999 | Keogh |
| 5,927,265 A | 7/1999 | McKee et al. |
| 5,928,072 A | 7/1999 | Fulcher et al. |
| 5,928,541 A | 7/1999 | Tsukamoto et al. |
| 5,934,178 A | 8/1999 | Caridis et al. |
| 5,934,182 A | 8/1999 | Harter et al. |
| 5,941,235 A | 8/1999 | Carter |
| 5,951,901 A | 9/1999 | Douglas et al. |
| 5,954,986 A | 9/1999 | Tsukamoto et al. |
| 5,988,154 A | 11/1999 | Douglas et al. |
| 5,990,466 A | 11/1999 | McKee et al. |
| 6,008,483 A | 12/1999 | McKee et al. |
| 6,031,208 A | 2/2000 | Witt et al. |
| 6,049,066 A | 4/2000 | Wilson |
| 6,058,924 A | 5/2000 | Pool, III et al. |
| 6,060,701 A | 5/2000 | McKee et al. |
| 6,064,050 A | 5/2000 | Ishikawa et al. |
| 6,079,321 A | 6/2000 | Harter et al. |
| 6,111,224 A | 8/2000 | Witt |
| 6,116,895 A | 9/2000 | Onuschak |
| 6,140,619 A | 10/2000 | Couch |
| 6,140,626 A | 10/2000 | McKee et al. |
| 6,146,678 A | 11/2000 | Caridis et al. |
| 6,175,099 B1 | 1/2001 | Shei et al. |
| 6,192,877 B1 | 2/2001 | Moshonas et al. |
| 6,218,650 B1 | 4/2001 | Tsukamoto et al. |
| 6,252,201 B1 | 6/2001 | Nevarez |
| 6,259,064 B1 | 7/2001 | Wilson |

(56) References Cited

U.S. PATENT DOCUMENTS

| | | | |
|---|---|---|---|
| 6,262,394 | B1 | 7/2001 | Shei et al. |
| 6,262,396 | B1 | 7/2001 | Witt et al. |
| 6,262,406 | B1 | 7/2001 | McKee et al. |
| 6,320,165 | B1 | 11/2001 | Ovadia |
| 6,323,462 | B1 | 11/2001 | Strand |
| 6,350,965 | B2 | 2/2002 | Fukushima et al. |
| 6,359,271 | B1 | 3/2002 | Gidner et al. |
| 6,376,817 | B1 | 4/2002 | McFadden et al. |
| 6,378,602 | B2 | 4/2002 | Brown |
| 6,384,381 | B2 | 5/2002 | Witt et al. |
| 6,399,930 | B2 | 6/2002 | Day et al. |
| 6,403,937 | B1 | 6/2002 | Day et al. |
| 6,425,388 | B1 | 7/2002 | Korinchock |
| 6,441,355 | B2 | 8/2002 | Thorneywork |
| 6,455,085 | B1 | 9/2002 | Duta |
| 6,476,368 | B2 | 11/2002 | Aronsson et al. |
| 6,486,455 | B1 | 11/2002 | Merabet |
| 6,494,130 | B2 | 12/2002 | Brown |
| 6,517,882 | B2 | 2/2003 | Elia et al. |
| 6,526,961 | B1 | 3/2003 | Hardenburger |
| 6,528,773 | B2 | 3/2003 | Kim et al. |
| 6,534,688 | B2 | 3/2003 | Klausmeyer |
| 6,539,934 | B2 | 4/2003 | Moshonas et al. |
| 6,541,739 | B2 | 4/2003 | Shei et al. |
| 6,552,305 | B2 | 4/2003 | De'Longhi |
| 6,576,874 | B2 | 6/2003 | Zapata et al. |
| 6,595,117 | B1 | 7/2003 | Jones |
| 6,614,007 | B1 | 9/2003 | Reay |
| 6,655,373 | B1 | 12/2003 | Wiker |
| 6,660,982 | B2 | 12/2003 | Thorneywork |
| 6,692,788 | B1 | 2/2004 | Mottram et al. |
| 6,693,261 | B2 | 2/2004 | Leutner |
| 6,712,063 | B1 | 3/2004 | Thorneywork |
| 6,712,064 | B2 | 3/2004 | Stacy et al. |
| 6,716,467 | B2 | 4/2004 | Cole et al. |
| 6,805,112 | B2 | 10/2004 | Cole et al. |
| 6,817,201 | B2 | 11/2004 | Yingst |
| 6,817,283 | B2 | 11/2004 | Jones et al. |
| 6,818,869 | B2 | 11/2004 | Patti et al. |
| 6,833,032 | B1 | 12/2004 | Douglas et al. |
| 6,833,533 | B2 | 12/2004 | Wolfe et al. |
| 6,869,538 | B2 | 3/2005 | Yu et al. |
| 6,874,495 | B2 | 4/2005 | McFadden |
| 6,880,545 | B2 | 4/2005 | Heber et al. |
| 6,903,318 | B2 | 6/2005 | Thorneywork |
| 6,914,221 | B1 | 7/2005 | Witt et al. |
| 6,933,472 | B1 | 8/2005 | Smith et al. |
| 6,933,473 | B2 | 8/2005 | Henke et al. |
| 6,934,690 | B1 | 8/2005 | Van Horn |
| 6,943,321 | B2 | 9/2005 | Carbone et al. |
| 6,968,565 | B1 | 11/2005 | Slaney et al. |
| 7,019,272 | B2 | 3/2006 | Braunisch et al. |
| 7,055,518 | B2 | 6/2006 | McFadden et al. |
| 7,082,941 | B2 | 8/2006 | Jones et al. |
| 7,087,872 | B1 | 8/2006 | Dobie et al. |
| 7,105,779 | B2 | 9/2006 | Shei |
| 7,192,272 | B2 | 3/2007 | Jones et al. |
| 7,196,291 | B2 | 3/2007 | Cothran |
| 7,220,946 | B2 | 5/2007 | Majchrzak |
| 7,227,102 | B2 | 6/2007 | Shei |
| 7,326,882 | B2 | 2/2008 | Faries, Jr. et al. |
| 7,328,654 | B2 | 2/2008 | Shei |
| 7,328,695 | B2 | 2/2008 | Tatsumu et al. |
| 7,329,847 | B2 | 2/2008 | Tatsumu et al. |
| 7,343,912 | B2 | 3/2008 | Jones et al. |
| 7,360,533 | B2 | 4/2008 | McFadden |
| RE40,290 | E | 5/2008 | Shei et al. |
| 7,370,647 | B2 | 5/2008 | Thorneywork |
| 7,424,848 | B2 | 9/2008 | Jones et al. |
| 7,435,931 | B1 | 10/2008 | McKee et al. |
| 7,446,282 | B2 | 11/2008 | Shei et al. |
| 7,468,495 | B2 | 12/2008 | Carbone et al. |
| 7,480,627 | B1 | 1/2009 | Van Horn et al. |
| 7,493,362 | B2 | 2/2009 | Bogatin et al. |
| 7,507,938 | B2 | 3/2009 | McFadden |
| 7,554,057 | B2 | 6/2009 | Monny Dimouamoua |
| 7,575,000 | B2 | 8/2009 | Jones et al. |
| 7,604,002 | B2 | 10/2009 | Rabas et al. |
| 7,624,676 | B2 | 12/2009 | Nishida et al. |
| 7,624,728 | B1 | 12/2009 | Forbes |
| 7,781,702 | B2 | 8/2010 | Nam et al. |
| 7,784,457 | B2 * | 8/2010 | Akdag ............... F24C 15/322 126/21 A |
| 7,792,920 | B2 | 9/2010 | Istvan et al. |
| 7,793,586 | B2 | 9/2010 | Rabas |
| 7,825,358 | B2 | 11/2010 | Kim |
| 7,836,874 | B2 | 11/2010 | McFadden |
| 7,836,875 | B2 | 11/2010 | McFadden et al. |
| 7,884,306 | B2 | 2/2011 | Leach |
| 7,886,658 | B2 | 2/2011 | McFadden et al. |
| 7,900,228 | B2 | 3/2011 | Stark et al. |
| 7,905,173 | B2 | 3/2011 | Sus et al. |
| 7,910,866 | B2 | 3/2011 | Hwang et al. |
| 7,921,841 | B2 | 4/2011 | McKee et al. |
| 7,941,819 | B2 | 5/2011 | Stark et al. |
| 7,942,278 | B2 | 5/2011 | Martin et al. |
| 7,946,224 | B2 | 5/2011 | McFadden |
| 7,956,304 | B2 | 6/2011 | Bacigalupe et al. |
| 8,006,685 | B2 | 8/2011 | Bolton et al. |
| 8,011,293 | B2 | 9/2011 | McFadden et al. |
| 8,029,274 | B2 | 10/2011 | Jones et al. |
| 8,035,062 | B2 | 10/2011 | McFadden et al. |
| 8,035,065 | B2 | 10/2011 | Kim et al. |
| 8,042,533 | B2 | 10/2011 | Dobie et al. |
| 8,047,128 | B2 | 11/2011 | Salvaro |
| 8,058,590 | B2 | 11/2011 | Thorneywork et al. |
| 8,058,594 | B2 | 11/2011 | Hwang |
| 8,063,342 | B2 | 11/2011 | Hines, Jr. |
| 8,071,922 | B2 | 12/2011 | Claesson et al. |
| 8,093,538 | B2 | 1/2012 | Claesson et al. |
| 8,113,190 | B2 | 2/2012 | Dougherty |
| 8,124,200 | B2 | 2/2012 | Quella et al. |
| 8,134,101 | B2 | 3/2012 | Majchrzak |
| 8,134,102 | B2 | 3/2012 | McKee et al. |
| 8,136,442 | B2 | 3/2012 | Strutin-Belinoff et al. |
| 8,143,560 | B2 | 3/2012 | Park et al. |
| 8,164,036 | B2 | 4/2012 | Lee |
| 8,168,928 | B2 | 5/2012 | Kim et al. |
| 8,210,844 | B2 | 7/2012 | Wolfe et al. |
| 8,212,188 | B2 | 7/2012 | Kim et al. |
| 8,218,955 | B2 | 7/2012 | Witt |
| 8,224,892 | B2 | 7/2012 | Bogatin et al. |
| 8,253,084 | B2 | 8/2012 | Toyoda et al. |
| 8,258,440 | B2 | 9/2012 | Shei et al. |
| 8,292,494 | B2 | 10/2012 | Rosa et al. |
| 8,297,270 | B2 | 10/2012 | McFadden |
| 8,304,702 | B2 | 11/2012 | Kim |
| 8,338,756 | B2 | 12/2012 | Shei et al. |
| 8,359,351 | B2 | 1/2013 | Istvan et al. |
| 8,378,265 | B2 | 2/2013 | Greenwood et al. |
| 8,389,907 | B2 | 3/2013 | Willett |
| 8,399,812 | B2 | 3/2013 | Thorneywork et al. |
| 8,490,475 | B2 | 7/2013 | Dejmek et al. |
| 8,561,321 | B2 | 10/2013 | Inoue et al. |
| 8,586,900 | B2 | 11/2013 | Kim et al. |
| 8,637,792 | B2 | 1/2014 | Agnello et al. |
| 8,658,953 | B2 | 2/2014 | McFadden et al. |
| 8,680,439 | B2 | 3/2014 | Shei et al. |
| 8,680,449 | B2 | 3/2014 | Kim |
| 8,695,487 | B2 | 4/2014 | Sakane et al. |
| 8,707,945 | B2 | 4/2014 | Hasslberger et al. |
| 8,733,236 | B2 | 5/2014 | McKee |
| 8,735,778 | B2 | 5/2014 | Greenwood et al. |
| 8,746,134 | B2 | 6/2014 | McKee |
| 8,893,705 | B2 | 11/2014 | McFadden |
| 8,895,902 | B2 | 11/2014 | Shei et al. |
| 8,941,041 | B2 | 1/2015 | Lee |
| 8,968,848 | B2 | 3/2015 | Quella et al. |
| 8,991,383 | B2 | 3/2015 | Johnson |
| 8,993,945 | B2 | 3/2015 | McKee |
| 9,074,776 | B2 | 7/2015 | Greenwood et al. |
| 9,074,777 | B2 | 7/2015 | Catalogne et al. |
| 9,134,033 | B2 | 9/2015 | Nevarez et al. |
| 9,157,639 | B2 | 10/2015 | Gallici et al. |

(56) References Cited

U.S. PATENT DOCUMENTS

| | | |
|---|---|---|
| 9,161,547 B2 | 10/2015 | McKee |
| RE45,789 E | 11/2015 | Shei et al. |
| 9,265,400 B2 | 2/2016 | Bigott |
| 9,277,598 B2 | 3/2016 | Lee et al. |
| 9,288,997 B2 | 3/2016 | McKee |
| 9,301,646 B2 | 4/2016 | Rosa et al. |
| 9,303,879 B2 | 4/2016 | Price et al. |
| 9,326,639 B2 | 5/2016 | McKee et al. |
| 9,341,382 B2 | 5/2016 | Kim |
| 9,351,495 B2 | 5/2016 | McFadden |
| 9,372,006 B2 | 6/2016 | McKee et al. |
| 9,474,284 B2 | 10/2016 | Dougherty |
| 9,480,364 B2 | 11/2016 | McKee et al. |
| 9,516,704 B2 | 12/2016 | Stanger |
| 2001/0025842 A1 | 10/2001 | Witt et al. |
| 2002/0003140 A1 | 1/2002 | Day et al. |
| 2002/0134778 A1 | 9/2002 | Day et al. |
| 2003/0141296 A1 | 7/2003 | Thorneywork |
| 2004/0026401 A1 | 2/2004 | Jones et al. |
| 2004/0163635 A1 | 8/2004 | Thorneywork |
| 2005/0000957 A1 | 1/2005 | Jones et al. |
| 2005/0045173 A1 | 3/2005 | Heber et al. |
| 2005/0173397 A1 | 8/2005 | Majchrzak et al. |
| 2005/0205547 A1 | 9/2005 | Wenzel |
| 2005/0211109 A1 | 9/2005 | Majchrzak et al. |
| 2005/0258171 A1 | 11/2005 | Witt |
| 2006/0020962 A1 | 1/2006 | Stark et al. |
| 2006/0026636 A1 | 2/2006 | Stark et al. |
| 2006/0026638 A1 | 2/2006 | Stark et al. |
| 2006/0031880 A1 | 2/2006 | Stark et al. |
| 2006/0041927 A1 | 2/2006 | Stark et al. |
| 2006/0064720 A1 | 3/2006 | Istvan et al. |
| 2006/0080408 A1 | 4/2006 | Istvan et al. |
| 2006/0085825 A1 | 4/2006 | Istvan et al. |
| 2006/0085835 A1 | 4/2006 | Istvan et al. |
| 2006/0102017 A1 | 5/2006 | Rabas et al. |
| 2006/0201495 A1 | 9/2006 | Jones et al. |
| 2007/0092670 A1 | 4/2007 | Quella et al. |
| 2007/0108179 A1 | 5/2007 | Hines, Jr. |
| 2007/0125319 A1 | 6/2007 | Jones et al. |
| 2007/0210064 A1 | 9/2007 | Quella et al. |
| 2008/0008795 A1 | 1/2008 | Thorneywork et al. |
| 2008/0092754 A1 | 4/2008 | Noman |
| 2008/0105133 A1 | 5/2008 | McFadden et al. |
| 2008/0105136 A1 | 5/2008 | McFadden |
| 2008/0105249 A1 | 5/2008 | McFadden et al. |
| 2008/0106483 A1 | 5/2008 | McFadden et al. |
| 2008/0127833 A1 | 6/2008 | Lee |
| 2008/0134903 A1 | 6/2008 | Kim et al. |
| 2008/0148961 A1 | 6/2008 | Hwang et al. |
| 2008/0148963 A1 | 6/2008 | Kim et al. |
| 2008/0149628 A1 | 6/2008 | Thorneywork et al. |
| 2008/0149630 A1 | 6/2008 | Hwang |
| 2008/0149631 A1 | 6/2008 | Lee |
| 2008/0149632 A1 | 6/2008 | Kim et al. |
| 2008/0149633 A1 | 6/2008 | Kim |
| 2008/0156202 A1 | 7/2008 | Park et al. |
| 2008/0245359 A1 | 10/2008 | Williamson |
| 2008/0296284 A1 | 12/2008 | McFadden et al. |
| 2008/0302253 A1 | 12/2008 | Salvaro |
| 2009/0095727 A1 | 4/2009 | Majchrzak |
| 2009/0139367 A1 | 6/2009 | Rosa et al. |
| 2009/0142719 A1 | 6/2009 | Scheuring, III et al. |
| 2009/0165778 A1 | 7/2009 | Harter et al. |
| 2009/0222612 A1 | 9/2009 | Thorneywork et al. |
| 2010/0000509 A1 | 1/2010 | Babington |
| 2010/0031193 A1 | 2/2010 | Stark et al. |
| 2010/0054717 A1 | 3/2010 | Lee et al. |
| 2010/0058936 A1 | 3/2010 | Schjerven, Sr. et al. |
| 2010/0126979 A1 | 5/2010 | Willett |
| 2010/0133263 A1 | 6/2010 | Toyoda et al. |
| 2010/0166398 A1 | 7/2010 | Witt |
| 2010/0320198 A1 | 12/2010 | Kim |
| 2010/0320199 A1 | 12/2010 | Kim |
| 2010/0326290 A1 | 12/2010 | Gallici et al. |
| 2010/0332994 A1 | 12/2010 | Istvan et al. |
| 2011/0005409 A1 | 1/2011 | Majchrzak |
| 2011/0083657 A1 | 4/2011 | Ploof et al. |
| 2011/0126818 A1 | 6/2011 | Behle et al. |
| 2012/0017770 A1 | 1/2012 | Sakane et al. |
| 2012/0021100 A1 | 1/2012 | Thorneywork et al. |
| 2012/0067226 A1 | 3/2012 | Claesson et al. |
| 2012/0118875 A1 | 5/2012 | Jussel |
| 2012/0138597 A1 | 6/2012 | Quella et al. |
| 2012/0187115 A1 | 7/2012 | Toyoda et al. |
| 2012/0192725 A1 | 8/2012 | Toyoda et al. |
| 2012/0248095 A1 | 10/2012 | Lee et al. |
| 2012/0328752 A1 | 12/2012 | Green et al. |
| 2013/0004630 A1 | 1/2013 | McFadden |
| 2013/0175253 A1 | 7/2013 | Shei et al. |
| 2013/0220296 A1 | 8/2013 | Catalogne et al. |
| 2013/0255657 A1 | 10/2013 | Schootstra et al. |
| 2013/0306052 A1 | 11/2013 | Price et al. |
| 2013/0306616 A1 | 11/2013 | Wildebush |
| 2014/0026764 A1 | 1/2014 | Sykes et al. |
| 2014/0048055 A1 | 2/2014 | Ruther |
| 2014/0083309 A1 | 3/2014 | Reese et al. |
| 2014/0099420 A1 | 4/2014 | Petronio et al. |
| 2014/0116268 A1 | 5/2014 | Bigott et al. |
| 2014/0137852 A1 | 5/2014 | Radford et al. |
| 2014/0161952 A1 | 6/2014 | Sykes |
| 2014/0161953 A1 | 6/2014 | Jones et al. |
| 2014/0174426 A1 | 6/2014 | Moon et al. |
| 2014/0202444 A1 | 7/2014 | Dobie |
| 2014/0216267 A1 | 8/2014 | McKee |
| 2014/0217083 A1 | 8/2014 | McKee |
| 2014/0231407 A1 | 8/2014 | Kantas |
| 2014/0261373 A1 | 9/2014 | Yingst et al. |
| 2014/0290003 A1 | 10/2014 | Mick et al. |
| 2014/0318387 A1 | 10/2014 | Kim |
| 2014/0322417 A1 | 10/2014 | Kim |
| 2014/0326710 A1 | 11/2014 | McKee et al. |
| 2015/0047514 A1 | 2/2015 | Abe et al. |
| 2016/0050939 A1 | 2/2016 | Riggle et al. |
| 2016/0066585 A1 | 3/2016 | Lago |
| 2016/0273843 A1 | 9/2016 | Wenzel |
| 2016/0327278 A1 | 11/2016 | McKee et al. |
| 2016/0345592 A1 | 12/2016 | McKee et al. |
| 2016/0348920 A1 | 12/2016 | Yingst et al. |
| 2016/0356504 A1 | 12/2016 | McKee et al. |
| 2016/0356506 A1 | 12/2016 | McKee et al. |
| 2016/0556505 | 12/2016 | McKee et al. |
| 2017/0010003 A1 | 1/2017 | Dougherty |
| 2017/0198922 A1* | 7/2017 | Oh .................. F24C 15/168 |

FOREIGN PATENT DOCUMENTS

| | | |
|---|---|---|
| EP | 1672284 A1 | 6/2006 |
| EP | 1732359 A2 | 12/2006 |
| EP | 2735806 A1 | 5/2014 |
| WO | 00064219 A1 | 10/2000 |
| WO | 2015101399 A1 | 7/2015 |

* cited by examiner

LOW-PROFILE MULTI-ZONE OVEN

CROSS REFERENCE TO RELATED APPLICATIONS

This application claims the benefit of U.S. patent application Ser. No. 14/733,533 filed Jun. 8, 2015; and U.S. patent application Ser. No. 15/016,093 filed Feb. 4, 2016, which is a continuation-in-part of U.S. application Ser. No. 14/733,533; and U.S. patent application Ser. No. 15/094,645 filed Apr. 8, 2016, which is a continuation-in-part of U.S. application Ser. Nos. 15/016,093 and 14/733,533; and U.S. patent application Ser. No. 15/224,319 filed Jul. 29, 2016; all of which are hereby incorporated by reference in their entireties.

BACKGROUND OF THE INVENTION

The present invention relates to food preparation ovens and in particular to a multi-zone oven providing proximate-air delivery of heated air directly through the shelves.

Convection ovens can improve cooking speed by dispersing stagnant air that can provide an insulating blanket around food in an oven. Such ovens normally provide a blower blowing heated air through an opening in the wall of the cooking cavity, the opening positioned in a way to increase air turbulence so as to provide even cooking.

One drawback to convection ovens is that different volumes of food as well as different food loading arrangements can radically change the airflow pattern and hence the cooking process. This can require a chef to develop extensive experience in how to load and operate the oven when different types of food items, different volumes of food of different placement of food within the cook cavity are used.

Higher cooking speeds and more consistent cooking can often be obtained by reducing the length of the path between the heated air and the food, for example, by delivering the heat through an array of horizontally dispersed openings positioned directly above and/or below the food, thereby increasing the surface area of food that is directly contacted by the delivered heat. This proximate-air delivery can improve the uniformity of cooking in a variety of different food loading patterns and for different types of food. In this regard, the short air delivery distance provides more predictable tractable airflow patterns. Common ovens of this type provide a set of upward and downward facing airstream openings in opposition on upper and lower walls of the oven cavity.

It would be desirable to provide ovens using this proximate-air delivery that could simultaneously cook a variety of different foods at different temperatures. Two-cavity proximate-air ovens are relatively simple to construct by simply stacking two single cavity ovens one on top of the other. Unfortunately, additional cavities can unduly increase the height of the oven or reduce the cooking volume because of the substantial space between cavities necessary for insulation between the cavities and for the plenums necessary for the air delivery.

SUMMARY OF THE INVENTION

The present invention provides a compact, multi-zone oven using proximate-air delivery, enabled by using extremely low profile separators between the cavities. The present inventors have recognized that absolute isolation between the cavities is not required and that substantial leakage can be managed by the active feedback control of cavity temperature and proper management of cavity loading, among other techniques. In addition, an innovative air distribution plate design operates with relatively thin plenums. By radically reducing the thickness of the separation between the different cavities, three- and four-zone ovens can be readily obtained while still satisfying desired ergonomic height restrictions.

Specifically then, at least one embodiment of the invention provides a multi-cavity oven having a housing defining an interior cooking volume surrounded by insulated outer walls and at least one door that may open and close to provide access to the interior cooking volume. A set of shelves subdivides the cooking volume into cooking cavities, the shelves providing separate upper and lower air channels each leading from respective air inlets to respective upwardly directed airstream openings and downwardly directed airstream openings. Each cavity provides a separate blower circulating air from the cavity into a lower air channel of a shelf above the cavity and an upper air channel of the shelf below the cavity, and each cavity provides a separate heater and a thermal sensor placed in the circulated air after the airstream openings but before the heater. A controller receives a control set point and a signal from the thermal sensor to control the heater.

It is thus a feature of at least one embodiment of the invention to provide a proximate-air, multi-zone oven in which the cavity shelves alone separate the oven cavities thereby greatly reducing the oven height and increasing usable cooking volume.

In this regard the shelves may have a vertical thickness of less than three inches or preferably less than two inches measured between an uppermost extent of airstream openings of the upper air channels and the lowermost extent of airstream openings of the lower air channels, and/or the upper and lower air channels of each shelf may have an average separation of less than one inch or preferably less than one half inch. Alternatively or in addition, the effective resistance between the upper and lower channels may be less than half of that through the outer oven wall.

It is thus a feature of at least one embodiment of the invention to accommodate increased heat leakage between the cavities in order to maximize cooking volume while reducing the height of a multi-zone oven having proximate-air delivery. This design may be contrasted from conventional wisdom that requires standard oven wall-grade insulation between cavities that operate at different temperatures. In addition, the inventors have recognized that it is possible to construct an air distribution plate system operable using relatively narrow shelf channels.

The controller may operate to control the airspeed through the channel to prevent an air temperature gain or loss from air passing through the channel, from inlet to airstream openings caused by thermal transfer with an adjacent air channel, of greater than five degrees Fahrenheit.

It is thus a feature of at least one embodiment of the invention to manage heat transfer between cavities to within values that can be actively compensated for by the independent temperature controls of the cavities.

The shelves may be replaceably removable from the interior cooking volume.

It is thus a feature of at least one embodiment of the invention to provide a multi-zone oven having compact partitions enabling ready removal useful for cleaning or changing cavity sizes.

The shelves may consist of a separately removable lower plenum providing lower air channels and a separately removable upper plenum providing upper air channels, at least one plenum providing a barrier wall separating the upper and lower air channels.

It is thus a feature of at least one embodiment of the invention to reduce the weight and bulk of the shelf by allowing it to be separated into different plenums. It is another object of the invention to provide a plenum component that can be used both for the shelves and also for the top and bottom of the cooking volume where only single directions of airflow are required.

The interior cooking volume may provide inwardly extending shelf supports supporting the lower plenum, and the upper plenum may rest directly on the lower plenum to be supported thereby.

It is thus a feature of at least one embodiment of the invention to minimize shelf height by ensuring close plenum abutment simplified by direct support.

Each plenum may provide an air distribution plate holding the airstream openings and an opposed barrier wall together with the air distribution plate defining the channel, and the air distribution plate and barrier wall may be user-separable components.

It is thus a feature of at least one embodiment of the invention to provide plenums (and shelves) with interior air channels that are nevertheless easily cleaned by separating the plenums and channel components.

The upper and lower plenums may provide different air distribution plates providing a different configuration of openings.

It is thus a feature of at least one embodiment of the invention to permit tailoring of the air distribution plate openings to the airflow within the shelves to provide even cooking.

The oven may include a manifold communicating between each blower and two channels to provide greater airflow through an upper channel of the lower plenum than to the corresponding lower channel of the upper plenum flanking a cavity.

It is thus a feature of at least one embodiment of the invention to manage airflow ratios through the agency of the manifold to optimize cooking performance while simplifying construction of the shelves and minimize their thickness. The multi-cavity oven may provide a single plenum at the top and bottom of the interior cooking volume providing an upper surface of the uppermost cavity and a lower surface of the lowermost cavity.

It is thus a feature of at least one embodiment of the invention to employ the plenum design to provide the uppermost downward airstream openings and lowermost upward airstream openings without requiring a full shelf or new part.

The multi-cavity oven may include at least one rack positionable on an upper surface of at least one shelf, the rack supported by the shelf to be stationary with respect to the shelf in spaced relationship from the upwardly directed airstreams.

It is thus a feature of at least one embodiment of the invention to provide a simple method of ensuring airflow out of the lower airstream openings is unobstructed by food placed on the shelf such as can be a problem with stationary positioning of the rack.

The temperature probe may be positioned in a wall of the oven communicating with the cavity through intake apertures to be upstream from the heater of the cavity and downstream from the airstreams.

It is thus a feature of at least one embodiment of the invention to place the temperature probe so as to permit compensation for heat transfer between different temperature cavities. As so positioned (in contrast front being directly downstream from the heater and upstream from the airstreams), the temperature sensor can provide guidance with respect to sensing and compensating for inter-cavity heat transfer.

The multi-cavity oven may further include a compliant seal positioned between the inner surface of the at least one door and a front edge of the shelf to block airflow past the shelf between adjacent cavities.

It is thus a feature of at least one embodiment of the invention to minimize airflow between the cavities, such airflow potentially resulting in undesirable heat transfer as well as potential flavor transfer.

An upper wall of the lower air channel of each shelf may slope downwardly from the air inlet and a lower wall of the upper air channel of each shelf may slope upwardly from the air inlet to provide an increasing air gap between the upper and lower channels possible with reduced airflow through the channels as one moves away from the air inlets.

It is thus a feature of at least one embodiment of the invention to increase the insulating space between the shelves when shelf channel thickness can be reduced as a result of reduced airflow toward its tip.

The controller may communicate with a display guiding the user in loading of food into cavities currently not used for cooking food based on temperatures of cavities currently used for cooking food.

It is thus a feature of at least one embodiment of the invention to manage "smart" loading of the oven to minimize temperature flow between the cavities and thus heat transfer.

The multi-cavity oven may provide for at least three cavities, and a separation between the upper wall of the interior cooking volume and a lower wall of the interior cooking volume may be less than 25 inches. Each cooking cavity may be at least five inches in height between a lower surface of the airstream openings of the upper shelf in an upper surface of the airstream openings of the lower shelf.

It is thus a feature of at least one embodiment of the invention to provide a multi-zone oven using proximate-air delivery having a compact height for improved ergonomic use.

In one embodiment, the set of shelves subdividing the cooking volume into cooking cavities may provide separate upper and lower air channels divided by at least one interior barrier wall and the barrier wall and jet plate may intercommunicate mechanically through a floating mounting adapted to resist warpage of the shelf with variations in thermal expansion of the barrier wall and jet plate.

It is thus a feature of at least one embodiment of the invention to permit extremely thin shelves without risk of disruptive warpage caused by oven temperatures. This is particularly important when the jet plate and barrier walls are of different lengths caused by intentional sloping of one or the other.

In at least one embodiment of the invention the blowers may communicate with the shelves through a bifurcated manifold providing extended transition sections of smoothly varying cross-section reducing a height of the transition section from an inlet to an outlet by no less than 50 percent.

It is thus a feature of at least one embodiment of the invention to provide for high airflow and low airflow resistance with extremely narrow high aspect ratio shelf inlets. Introduction of the transition section allows these narrow shelves to receive air with minimized air back resistance.

The transition sections may simultaneously provide a smoothly varying cross-section increasing a width of the transition section from the inlet to the outlet by at least 50 percent. It is thus a feature of at least one embodiment of the invention to minimize velocity changes in the airflow such as could cause turbulence by minimizing cross-sectional area variation to the extent possible.

These particular objects and advantages may apply to only some embodiments falling within the claims and thus do not define the scope of the invention.

DETAILED DESCRIPTION OF THE PREFERRED EMBODIMENT

Figure 1:
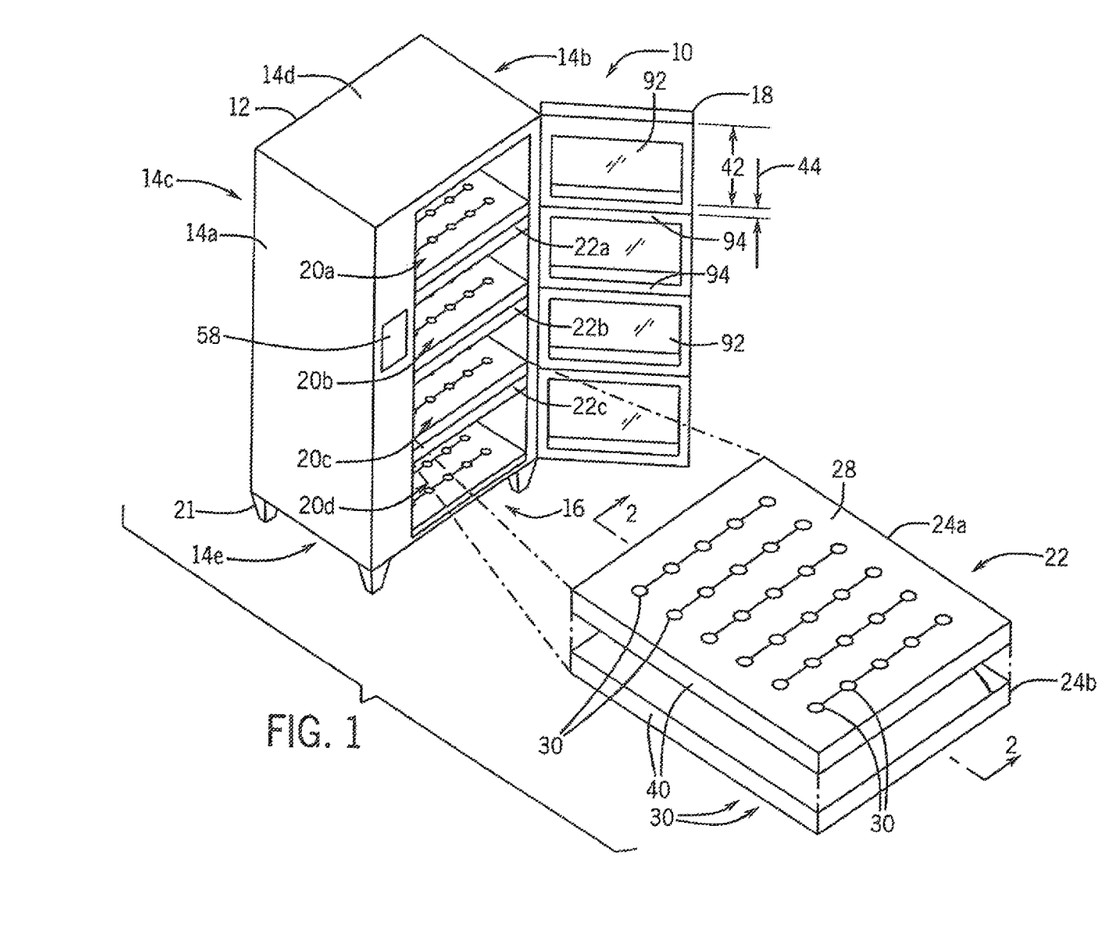
FIG. 1 is a perspective view of a four-cavity oven according to one embodiment of the present invention showing an expanded detail of a shelf made of separate upper and lower plenums individually removable through the open door of the oven.

Referring now to FIG. 1, a multi-zone, proximate-air delivery oven 10 may provide for a housing 12 having upstanding insulated outer sidewalls 14a and 14b and an upstanding outer insulated rear wall 14c extending between and joining opposed generally horizontal insulated outer upper walls 14d and 14e. The resulting cooking volume 16 is open on the front and this opening may be covered by hinged door 18 when the door 18 is in a closed position or accessible through the hinged door 18 when the door 18 is in an open position as is generally understood in the art. The housing 12 may be supported on one or more legs 21 extending downwardly from a bottom surface of the bottom wall 14e.

The cooking volume 16 may be divided into multiple cooking cavities 20a-d. Although four cooking cavities are shown, the invention contemplates a range from 2 to 6 cooking cavities 20 in vertical, spaced separation. Each of the cooking cavities 20 is separated by a thin shelf 22a-c with shelf 22a separating cavities 20a and 20b, shelf 22b separating cavities 20b and 20c and shelf 22c separating cavities 20b and 20d.

Figure 2:
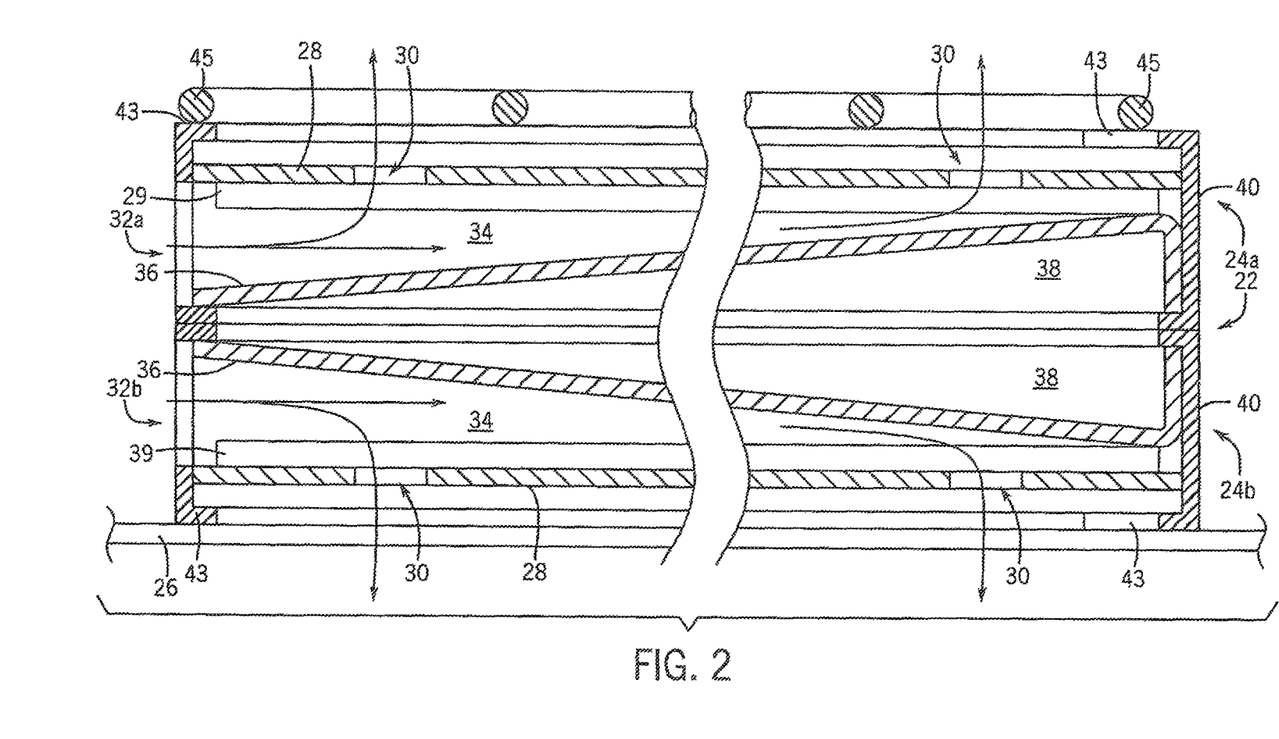
FIG. 2 is a cross-sectional view taken along line 2-2 of FIG. 1 showing the segregated internal air channels in the shelf such as may conduct different temperatures of air while maintaining thermal separation between the cavities by active insulation and other techniques.

Referring also to FIG. 2, each shelf 22 comprises a separate upper and lower generally rectangular plenum 24a and 24b fitting horizontally in the cooking volume 16. When the shelf 22 is installed, a lower edge of the plenum 24b may rest on rails 26 extending inwardly from the inner surface of the walls 14a and 14b and the upper plenum 24a may rest directly on top of the lower plenum 24b for reduced total height.

Each plenum 24 provides an outer, horizontally extending air distribution plate 28 having a set of airstream openings 30 distributed over its area to provide for substantially even airflow therethrough. The air distribution plate 28 may be substantially planar and may have one or more reinforcing ribs 29 attached along its inner surface to prevent thermal warping of opposed edges of the slot-like airstream openings 30 in the air distribution plate 28 as will be described below. The reinforcing ribs 29 may be relatively thin as measured along the length of the airstream openings 30, for example, less than ⅛ of an inch or less than 1/16 of an inch, to minimize disruption of air through the airstream openings 30.

Air enters through sidewalls of each of the plenums 24a and 24b at air inlets 32a and 32b, respectively. These air inlets 32 may be as little as 1½ inches tall and preferably less than one inch tall. From the air inlets 32a and 32b, the air then passes through a horizontally extending channel 34 defined by an inner surface of the air distribution plates 28 and inner surface of a barrier wall 36 opposite the air distribution plate 28 about the channel 34. The barrier wall 36 has a maximum separation from the air distribution plate 28 at the air inlet 32 and then curves inward toward the air distribution plate 28 as air conducted in the channel 34 escapes through the airstream openings 30 and less channel height is needed. This inward sloping of the barrier walls 34 for each of the plenums 24a and 24b together provides an additional insulation zone 38 between the barrier walls 36 of the upper and lower plenums 24a and 24b, respectively, minimizing shelf height but maximizing insulation value. The average separation of the barrier walls 36 may be approximately one inch varying from contact between the barrier walls to nearly 2 inches in separation. Invention contemplates an average separation of at least one-quarter inch and preferably at least one inch.

A peripheral wall 40 of each plenum 24 surrounds the air distribution plate 28 and the barrier wall 36 to corral air within the channel 34 in all directions except through the inlets 32 and the airstream openings 30. Peripheral wall 40 also provides inwardly horizontally extending tabs 43 which may support a wire rack 45 at a separation of approximately ¼ inch and at least ⅛ inch above the upper extent of the air distribution plate 28 of the upper plenum 24a. In one embodiment the wire rack 45 may be supported by more than one inch above the air distribution plate 28 and desirably more than 1.5 inches above the air distribution plate either through the use of a special wire rack 45 or extender tabs 43 (not shown). In this way, a cooking sheet or pan set on top of the shelf 22 rests on the wire rack 45 and does not block the airstream openings 30. In a preferred embodiment, a separation 44 (shown in FIGS. 1 and 4) between the uppermost extent of the airstream openings 30 of the air distribution plate 28 of the upper plenum 24a and the lowermost extent of the airstream openings 30 of the air distribution plate 28 of the lower plenum 24b will be less than four inches, preferably less than three inches and desirably less than two inches providing an extremely compact shelf maximizing cavity space and minimizing total height. The cavities 20 (shown in FIGS. 1 and 4) will have a nominal height 42 of from between four and nine inches and preferably five inches or more defined by the distance between air distribution plates 28 bounding the upper and lower extent of the cavity 20. In one nonlimiting example, each cavity may add a height of about seven inches to the oven so that three cavities may have a height of no more than 23 inches or at least no more than 25 inches and four cavities may have a nominal height of 30 inches and no more than 35 inches.

Generally the shelves 22 may be constructed entirely of stainless steel for durability and ease of cleaning, and although the invention contemplates that thin insulating materials may also be incorporated into the shelves 22 in some embodiments, the invention contemplates that no nonmetallic shelf construction materials are required. The barrier walls 36 may be held within each plenum 24 with a "floating mounting" allowing sliding of the barrier walls 36 with respect to the other structures of the plenums 24, for example, by creating a sliding fit between these components augmented by a natural flexure of the metal of the barrier walls 36 providing a light pressure between the barrier walls 36 and the ribs 29 and inwardly extending lips of the peripheral walls 40. In this way, extremely thin plenums 24 may be developed without warpage at high temperature by preventing warpage forces produced by the barrier walls 36 on the plenums 24 such as is relieved by sliding. This sliding feature may be extended to allow the barrier walls 36 to be removed horizontally through the inlets 32 to eliminate any enclosed pockets for easy cleaning of the plenums 24 when removed from the oven 10. Other "floating mountings" are contemplated by the invention including those which provide for flexible or spring-loaded mounting that allows relative different expansion and contraction rates of the broad area air distribution plate 28 and barrier walls 36 to prevent warping and buckling of either or both or the plenum 24 such as can be particularly acute for extremely thin shelves 22 and plenums 24 at higher temperatures such as above 275 degrees Fahrenheit.

Figure 7:
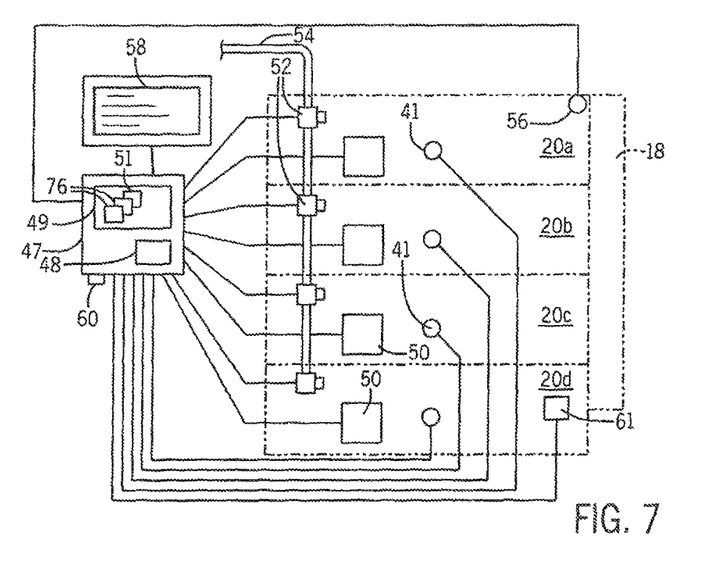
FIG. 7 is a simplified electrical schematic showing the separate control loops provided by the present invention for separate temperature control of each cavity and active insulation.

Referring now to FIG. 7 each of the cavities 20 may be associated with a temperature sensor 41 communicating with a controller 47, for example, being a microcontroller having one or more processor 48 executing programs and communicating with an associated memory 49, holding an operating program 51 and various recipe schedules 76 as will be discussed in more detail below. The temperature sensors 41 may be thermistors, resistive temperature sensors or the like.

Each cavity 20 may also be associated with an airflow system 50 comprising a heater system, blower motor and variable speed motor controller so that the controller 47 may independently control the airflow circulating through each cavity 20 through a continuous range and may control the temperature of that air through a continuous range of temperatures. The heater system may be, for example, an electric resistance heater such as a "cal" rod controlled by a solid-state relay or may be a heat exchanger of an electrically controllable gas burner system.

Optionally, each cavity 20 may have an electrically controllable valve 52 communicating with a common water supply 54 (either sourced from a self-contained water source or external plumbing) so that moisture may be introduced into the cavity by a signal to the controllable valve 52 from the controller 47 to allow independent control of moisture according to a cooking schedule. Mechanisms for the introduction of controlled moisture into an oven cavity 20 suitable for the present invention are described, for example, in U.S. Pat. Nos. 9,375,021; 7,307,244; 7,282,674 and 6,188,045 assigned to the assignee of the present application and hereby incorporated by reference.

The controller 47 may also receive a signal from a door close sensor 56 (such as a limit switch or proximity switch) and may provide for input and output to an oven user through a user interface 58 such as a touch screen, graphic display, membrane switch or the like such as are well known in the art. A data connector 60 may communicate with the controller 47 to allow for the readily uploading of cooking schedules 76 over the Internet or by transfer from a portable storage device or the like.

One or more of the cavities 20 may also include a smoker 61, for example, providing a compartment that may hold woodchips or the like to be heated by an electric element controlled by the controller 47 through corresponding solid-state relays. The construction of a smoker 61 suitable for the present invention is described, for example, in U.S. Pat. Nos. 7,755,005; 7,317,173; and 7,157,668 each assigned to the assignee of the present invention and hereby incorporated by reference.

Figure 3:
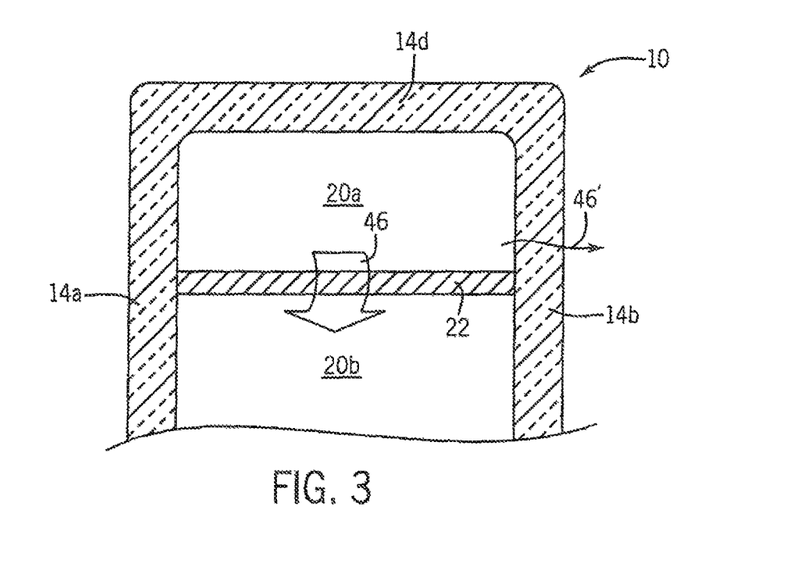
FIG. 3 is a simplified schematic representation of the insulation in the walls of the oven compared to that provided by the shelves showing the accommodation of substantial heat leakage allowing for shelf height minimization.
Figure 4:
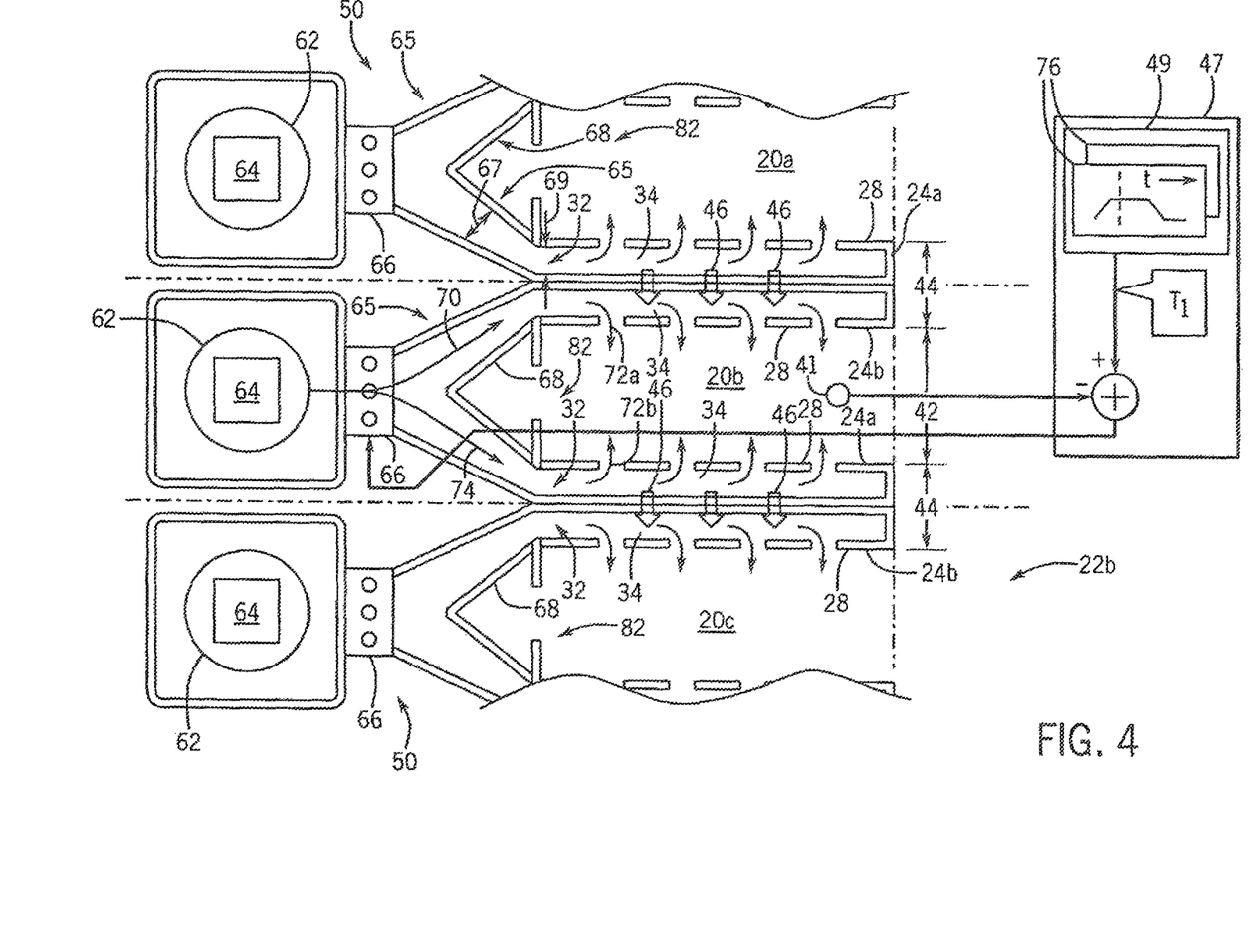
FIG. 4 is a simplified block diagram of the air delivery system and controller such as provides for active insulation between the cavities using feedback control.

Referring now to FIGS. 3 and 4, the thermal resistance of each shelf 22 will be substantially less than that necessary to provide for thermal isolation of each oven cavity 20 and equal to the isolation between the cooking volume 16 and the kitchen as is provided by the insulation values in the walls 14. For example, the walls 14 may have one inch of fiberglass mat with a reflective aluminum foil providing thermal resistance R-value of 3-4 (one inch material having a k-value of approximately 0.04 W/mK). In contrast, the effective thermal resistance between the upper and lower channels when separated by an average one-inch air gap is estimated to have an R-value of approximately 1 (one inch material having a k-value of approximately 1.44). Accordingly the effective thermal resistance between the upper and lower channels will be less than one half of that through the outer oven walls 14. This is in contrast to existing practice of multi-cavity ovens to make the thermal resistance between the oven cavities substantially equal to that between the cavities and the kitchen.

Lower R-value shelves 22 provide improved oven cavity utilization and, importantly, ergonomically improved oven height when multiple cavities are desired and offer an improved ability to remove the shelves 22 for cleaning or changing cavity size. Nevertheless, the lower R-value shelves provide significant inter-cavity thermal transfer 46 in contrast with normal levels of thermal transfer 46' through isolating insulation of the walls 14. For example, with 400 degree Fahrenheit air moving through an upper plenum 24a, the still air of adjacent lower plenum 24 of an unused cavity 20 beneath the lower plenum 24 will asymptotically approach temperatures over 300 degrees Fahrenheit without activating the heater of the unused cavity 20.

The present inventors have recognized such increased heat transfer can be accommodated through a combination of one or more of: (1) managing the cavity temperatures to minimize temperature differences between cavities; (2) ensuring sufficient airflow through the shelves to minimize absolute temperature gain in the air as it passes through the shelves; (3) offsetting heat gain and heat loss through the separate independent feedback control systems for each cavity; (4) managing airflow to increase thermal resistance to unused cavities; and (5) maximizing separation between airflows within a shelf through sloped barrier walls described above. With respect to (2) the problems associated with forced air in increasing thermal transfer through low R-value shelves can in fact be exploited, as will be described, to manage that thermal transfer effectively.

Referring now to FIG. 4, as discussed, above, the airflow system 50 of each cavity 20 (indicated generally by separating dotted lines) may include a separate blower 62 independently controlled by a variable speed motor and motor drive 64. The blower 62 may be, for example, a squirrel cage blower and the motor a DC synchronous motor driven by a solid-state motor controller of a type known in the art. The use of separate blowers 62 permits full segregation of the airflows within each cavity 20. The use of a separate motor and motor drive 64 allows independent airspeed control of the air in each cavity 20.

The airflow system 50 may also include a heater unit 66 and the air from each blower 62 may pass through a heater unit 66 to be received by a bifurcated manifold 68 which separates the heated airstream into an upper airstream 70 and lower airstream 74. The upper airstream 70 passes into the channel 34 (shown in FIG. 2) of a lower plenum 24b of an upper shelf 22 defining an upper wall of the cavity 20 and then exits from the channel 34 as a set of downwardly directed airstreams 72a from each of the airstream openings 30 (shown in FIG. 2) distributed over the lower area of the plenum 24b. The lower airstream 74 passes into the upper channel 34 of upper plenum 24a of a lower shelf 22 defining a lower wall of the cavity 20 to exit from the channel 34 as a set of upwardly directed airstreams 72b from each of the airstream openings 30 (shown in FIG. 2) distributed over the upper area of the plenum 24a.

The bifurcated manifold 68 may be designed to provide substantially greater airflow in the upper airstream 70 than the airflow of the lower airstream 74, for example, by constrictions or orientation of the branches of the bifurcated manifold 68 with respect to the natural cyclic flow of the blower. In one example, the air may be split so that 53 to 60 percent of the heated air is allocated to the lower shelf sending air upward, and 40-57 percent of the heated air is allocated to the upper plenum pulling downward as described in U.S. patent application Ser. No. 15/016,093 cited above.

Significantly, the location of the exit of the blower 62 is located approximately midway between the shelves 22 so that each leg of the manifold may provide an aerodynamic reducer/expander 65 of approximately 4.75 inches and at least three inches long for gradually reducing, the exit area height of the blower 62 to the extremely narrow inlet 32 of the plenums 24 and expanding its width to the much wider plenums 24. Without this reducer/expander 65, an extremely high air resistance would be generated in attempting to three air into the extremely high aspect ratio plenums 24 such as would resist effective air conduction. For example, each manifold 68 may receive air at an area having a height of approximately four inches which will be split into two 2-inch high branches and then smoothly reduced to the approximately one inch high area of each plenum 24. At the same time, the approximately 4.15 inch wide area at which air is received by the manifold 68 may be expanded to the full width of the shelf (approximately 15 inches and at least 14 inches) through a smoothly transitioning expander. Importantly, 90 degree turns such as creates significant turbulence and back resistance are avoided and the change in air velocity through the reducer/expander 65 is minimized. Generally the walls of each reducer/expander 65 may be constructed of planar sheets of sheet metal for simplified manufacturing and reduced air turbulence.

This arrangement of blowers, airflow systems 50 and bifurcated manifold 68 is duplicated for each cavity 20. In the uppermost cavity 20a only a single lower plenum 24b is provided at the top of that cavity 20a and in the lowermost cavity 20d only a single upper plenum 24a is provided, each being effectively one half of shelf 22.

A first element of the active insulation process of the present invention may be understood by considering a cooking schedule 76 held in the memory 49 of the controller 47; the cooking schedule 76 requires a given time for a cooking cavity command temperature of $T_1$. Initially, the upper airstream delivered to the cavity 20b, for example, may be heated by the heater unit 66 to a command temperature $T_1$ through a feedback control structure in which the temperature of the air in the cavity 20b is sensed by the sensor 41. A difference between the command temperature of $T_1$ and the temperature measured by the temperature sensor 41 provides a control signal that controls the heater unit 66, for example, by pulse width modulation. Under this control strategy, when the temperature of the cavity 20b sensed by the sensor 41 rises above command temperature $T_1$, the heater unit 66 will be deactivated, and conversely when the temperature of the cavity 20b sensed by the sensor 41 falls below command temperature $T_1$, the heater may be activated by the controller 47. It will be appreciated that this is a simplified description of feedback control which may provide more sophisticated proportional/integral/derivative type control mechanisms as are understood in the art further modified as will be discussed below.

Consider now the introduction of food into the adjacent upper cavity 20a for cooking at a temperature substantially above the command temperature $T_1$. The heating of the cavity 20a results in heat leakage 46 from the upper plenum 24a of the upper shelf 22 into the lower plenum 24b where it heats airstream 70 to a higher temperature than desired resulting in air exiting in airstreams 72a at a temperature $T_1+\Delta T$. The temperature of this air will then be sensed by the thermal sensor 41 resulting in a deactivation of the heater unit 66 until the upper airstream 70 from the manifold 68 effectively reaches a temperature of $T_1-\Delta T$. This cool air at $T_1-\Delta T$ will then enter the channel 34 and be heated by an amount $\Delta T$ from leakage heat. The result is that the exiting air of airstreams 72a will be raised exactly to the desired regulated temperature of $T_1$ despite heat leakage.

The ability to implement this "active insulation" by using a feedback control system requires that the $\Delta T$ component be kept relatively small so that it does not adversely affect the cooking process before a correction can be undertaken. In this regard, the invention employs the movement of the air through the channel 34 (such as could otherwise exacerbate the effects of heat leakage between the plenums 24) to ensure sufficient velocity of airflow through the channel 34 of the lower plenum 24b at all times to so constrain the $\Delta T$ value to within a predetermined value that can be readily compensated by control of the heater unit 66. By keeping the value of $\Delta T$ small by ensuring a given air velocity and thus reduced dwell time of air within the channel 34, the effects of heat leakage can be greatly mitigated.

Settings of the parameters of feedback control, for example, in a proportional/integral/derivative controller may be adjusted using the controller's "knowledge" of the regulated temperatures to estimate heat leakage and adjust the control loop parameters (integral, proportional, and derivative terms) appropriately to ensure proper control loop accuracy. Thus, for example, the controller 47 may anticipate additional heat loads from leakage knowing the control temperature profile of the adjacent cavities by introducing feedforward terms between cavities. In addition or alternatively, each schedule 76 may be modified according to knowledge held in the controller 47 with respect to the adjacent cavity temperatures.

The implementation of the above-described active insulation is further complicated by heat leakage 46 through the lower shelf of cavity 20b which, like the heat leakage 46 in the upper shelf 22, may be in either direction. Accordingly, the controller 47 must accommodate the net effect of heat leakage through the upper and lower shelves 22 associated with a given cavity 20. The use of a single sensor 41 positioned appropriately can automatically implement a control strategy based on a weighted temperature of the airstreams 72a and 72b when compared to the command temperature $T_1$. Alternatively, multiple sensors 41 may be used to measure the temperatures of airstream 72a and 72b separately, and the signals may be weighted, for example, allowing the airstreams 72b to run somewhat cooler or hotter than the desired cooking temperature.

Figure 6:
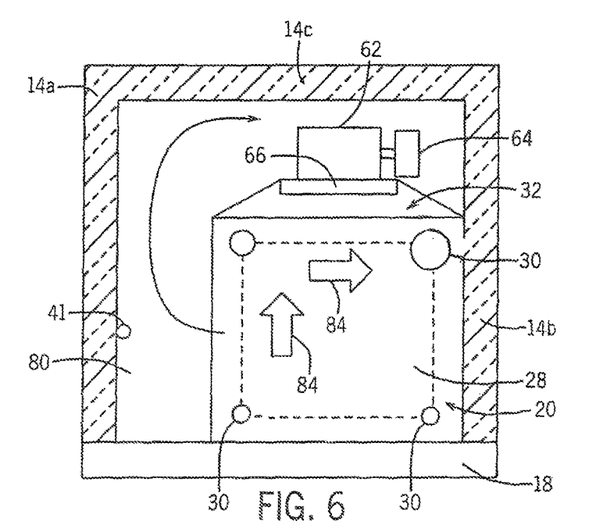
FIG. 6 is a planar cross-section through the oven showing the return air passage and a pattern of different airstream sizes to provide for even air flow through each opening.

In this regard, it is important that the sensors 41 be placed after the openings and before the heater unit 66. Referring now to FIG. 6, generally a return air passage 80 may be provided on either the left or right side of the cavity 20 and/or at the rear of the cavity 20 providing a path of return air back to the blower 62 after the air exits through air distribution plate airstream openings 30. The asymmetry in airflow from the introduction of air at inlets 32 at one end of each shelf 22 and the withdrawal of air, for example, from the side of the cavity 20 and its rear wall through the return air passage 80 can be compensated for by graduating the size of the airstream openings 30, for example, to generally increase in size away from the return air poll 82 (from FIG. 4) and return air passage 80 and decreasing the hole sizes as one moves away from the air inlets 32 as depicted to establish a two-dimensional gradient indicated by arrows 84. In one embodiment the temperature sensor 41 may be placed in this return air passage 80 to be protected from damage but to monitor excess heat introduced into the air from adjacent cavities.

Figure 5:
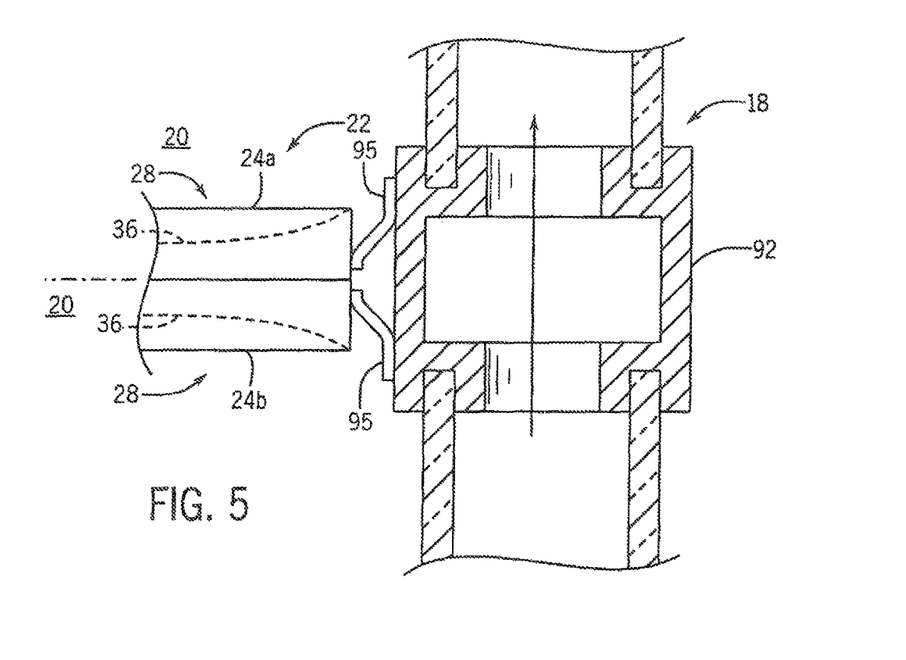
FIG. 5 is an elevational cross-section through the door of FIG. 1 closed against the shelf to provide sealing against airflow between the cavities.

Referring now to FIGS. 1 and 5, when a single door 18 is used on the oven 10, it may be divided into a set of glass panels 92 separated from each other within a framework having horizontal separator mullions 94 generally aligned with a front edge of each shelf 22. The glass panels 92 may provide for at least one insulating air layer (two separate spaces can be produced using an additional glass panel 92 not shown) that is vertically continuous to allow convection airflow through openings in the bottom of the door and out of openings at the top of the door (neither shown) to preserve a temperature to the outer surface of the frontmost glass panel 92 for safety. For this purpose, the mullions 94 may provide for a free passage of air upward between the glass panels 92. A pliable gasket or compliant sealing flange 95 may be attached to the inner surface of the mullions 94 to fill the gap between the front edge of the shelf 22 and the door when the door 18 is closed reducing the flow of air or moisture between cavities 20.

Figure 8:
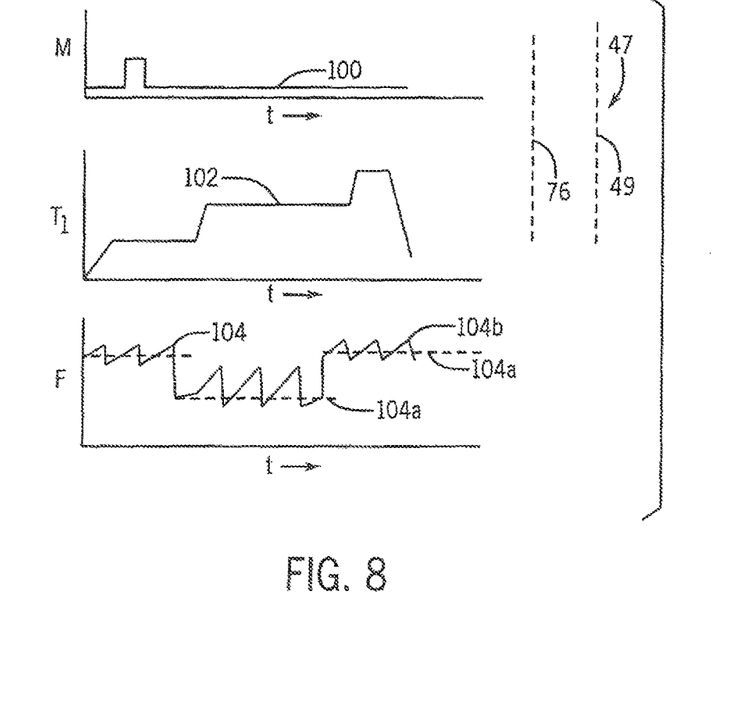
FIG. 8 is a simplified example of a temperature blower control profile such as may be used with the present invention.

Referring now to FIGS. 4, 7 and 8, as noted, the memory 49 of the controller 47 may hold a series of cooking schedules 76 (recipes) each providing cooking schedules 76 describing cooking parameters as a function of time. The schedules 76 may include a moisture schedule 100, a temperature schedule 102, and a blower speed schedule 104. A schedule similar to the moisture schedule 100 (not shown) may control a smoker feature. The blower speed schedule 104 may include an average blower speed 104a (indicated by the dotted line) having a superimposed blower fluctuation function 104b, for example, increasing and decreasing blower speed so as to break up stagnant air patterns from the airstream openings 30 such as may contribute to uneven heating. By fluctuating the blower speed of the blowers 62, hotspots in the food when the food is stationary with respect to the airstream openings 30 may be further reduced eliminating the need for conveyor systems or rotary platforms on which the food is placed to prevent localized burning of the food as opposed to a desired even cooking.

This schedule information is accessible by the controller 47 for all cavities 20 and may be used to accommodate the thermal interaction between cavities 20 (as has been discussed) and to instruct the user with respect to optimal loading of the oven 10. More generally, the schedule information is used by the controller 47 to permit complex changes of temperature, moisture and airflow during cooking tailored to particular recipes. In this regard, the user may identify a recipe, for example, and the cooking of a certain food item in this recipe may be linked to a schedule developed for that food item without the need for the user to directly program the actual schedule.

Figure 9:
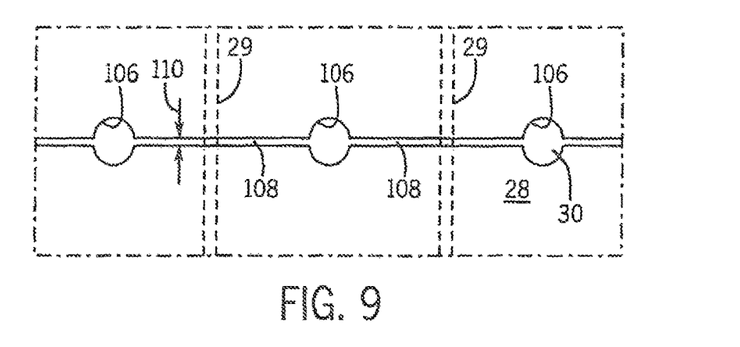
FIG. 9 is a top plan detail of an air distribution plate of FIG. 2 showing a configuration of holes joined by slots together with underlying reinforcing ribs.

Referring now to FIG. 9, the airstream openings 30 in the air distribution plate 28 may provide a series of holes 106 of the variable size as discussed generally with respect to FIG. 6 joined by slots 108. The airstream openings 30, comprising both the holes 106 and slots 108, create a slot-form extending the full width or depth of the oven (or diagonally between sidewalls of the oven) as described in U.S. patent application Ser. No. 15/224,319 referenced above. Generally a width 110 of the slots 108 will be less than 0.05 inches and preferably less than 0.1 inches to reduce pressure loss in the channel 34 that could result from high slot area. The holes 106 are much larger than the slot 108 and maybe circular and, may have a diameter ranging from 0.3 inches to 0.6 inches to provide airstreams that help shepherd the air from the slots 108 while also minimizing loss of air pressure. Slot lengths may vary between 1 to 2 inches and are preferably approximately 1.6 inches. The air distribution plate 28 is a thin sheet of metal, for example, stainless steel, with a thickness less than ⅛ inch and typically less than 1/16 inch, such as may be easily formed using laser cutting techniques.

Figure 10:
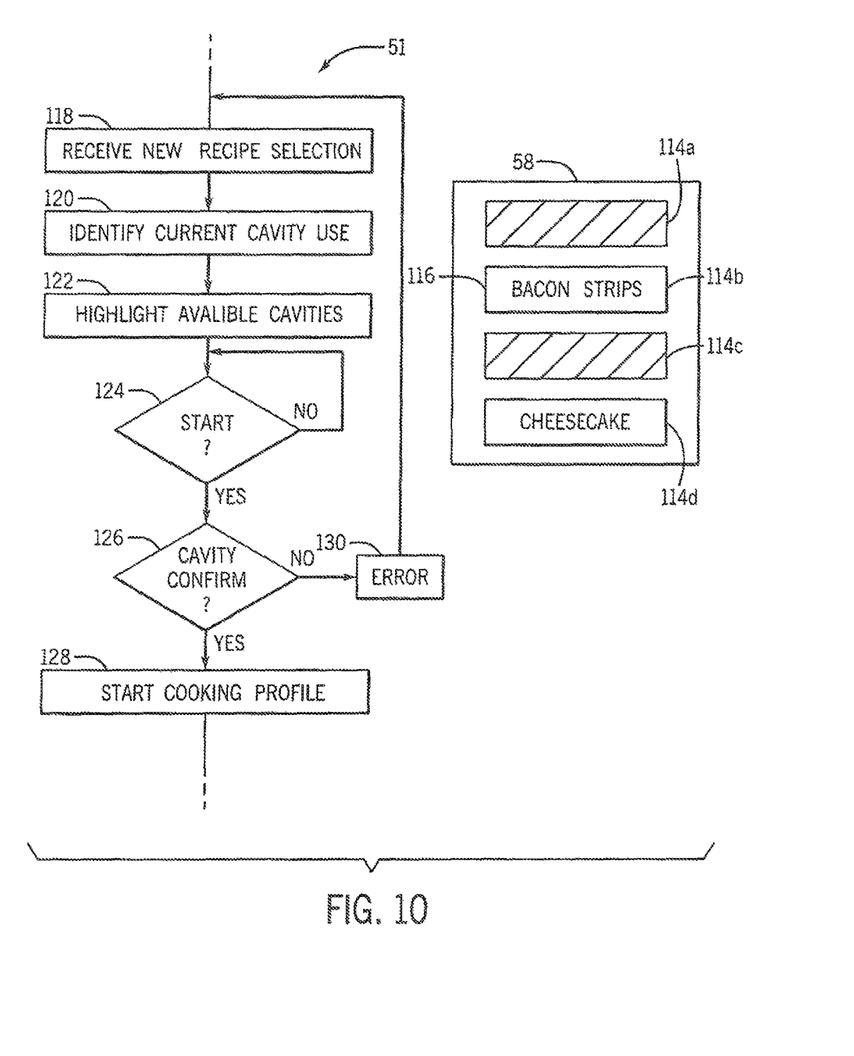
FIG. 10 is a side-by-side representation of a graphic control screen and flowchart of the program in guiding the user for proper cavity use.

Referring now to FIG. 10, the compact shelf arrangement of the present invention is facilitated through the use of a control program that helps allocate different cooking recipes to the proper cavities 20. In this respect, the user interface 58 may provide for a graphic indications, for example, providing an icon 114a-c associated with each of the cavities 20a-d and arranged vertically in a manner similar to the cavities 20. Any given cooking schedule 76 being implemented by a cavity may be identified, for example, by a recipe label name 116.

In a first case, if there are no other cavities 20 being used, the user may enter a new desired recipe (associated with a schedule 76) at process block 118. For example, the user may indicate a desire to cook bacon strips having a peak cooking temperature of 450 degrees Fahrenheit. Using one or more of the peak and average temperature of identified schedule 76, an operating program 51 of the controller 47 will recommend one or more of the four cavities 20 to the user for placement of the desired food item of bacon strips. In making this recommendation, the operating program 51, in the absence of other schedules of cooking items, operates to place high temperature recipes in the higher cavities 20 to take advantage of natural temperature gradients established by convective effects thereby conserving power and improving compatibility between possible additional recipes. In one embodiment, schedules 76 having an average or peak temperature above 375 degrees Fahrenheit are preferentially placed in the top or upper two cavities 20a and 20b and this recommendation is enforced by a graying out on user interface 58 of the icons 114 for lower cavities 20c and 20d. Conversely, schedule 76 having an average or peak temperature of less than 325 degrees Fahrenheit is preferentially placed in the bottom or lower two cavities 20c and 20d.

In a second case, where there is already food being cooked, the operating program 51 makes recommendations of cavity loading based on the schedules 76 of the food being currently cooked and the new food to be cooked at process block 120. The operating program 51 then recommends a cavity 20 for the new food necessary to ensure that the difference in temperature between two adjacent cavities does not exceed the maximum temperature difference practical with the shelves 22 using active insulation. For example, the maximum temperature difference may be 50 degrees Fahrenheit or another predetermined value for example 90 degrees Fahrenheit depending on the characteristics of the oven, and the operating program 51 may review each cavity 20 to test whether this maximum temperature difference would be exceeded and if so to gray-out those cavities preventing the user from using them for the new recipe. Thus, for example, if bacon strips are being cooked in cavity 20b at 425 degrees Fahrenheit and the new food to be cooked is cheesecake at a cooking temperature of 325 degrees Fahrenheit, the operating program 51 will require the user to select cavity 20d separated from cavity 20b by cavity 20c. Specifically adjacent icons 114a and 114c may be grayed out as indicated by process block 122 to indicate those cavities 20 are not available and control for those cavities 20 may be locked out from the user. Instead, a lower cavity 114d is identified for a low temperature cheesecake recipe providing sufficient thermal isolation between cavities associated with the cheesecake.

Conversely if the temperatures of the schedule of the new recipe is within the necessary temperature difference required of adjacent cavities 20, the new food item is placed in a cavity closest to the currently cooking food item so as to reduce energy usage by reducing the temperature difference across the partitioning shelf and thus heat transfer through the partitioning shelf.

Once the proper cavity is selected, the user may then press a start button (implemented on user interface 58) as detected by decision block 124. As part of this process, the user may acknowledge that he or she is using the cavity location recommended by the control program 51 at decision block 126. After this acknowledgment, cooking is begun as indicated by process block 128. Failure to acknowledge the correct cavity provides an error message to the user at process block 130 and allows a reentry of the necessary recipe data.

During the cooking process of process block 128, the control system controls the heater, blower, moisture, and smoker as provided by the cooking schedules 76 of FIG. 8.

When the door 18 is opened, for example, and is detected by sensor 56, the speed of the blowers 62 may be moderated to reduce air escape through the open door. For example, the blowers 62 may be operated at a low level but a level sufficient for the suction force of the return air to generally prevent heated air from escaping out the open door, and the schedules 76 may be halted to account for lost cooking time. As noted above, at all times during the cooking of food in adjacent cavities 20, a predetermined minimum airflow is provided through the channels 34 of the shelves 22 to prevent excess heating of the air flowing through the channels 34 such as could not readily be corrected or compensated for using the temperature control system. This airflow may be selected, for example, to ensure less than a 5 degree Fahrenheit increase in temperature of the air flowing through the air channel 34 based on knowledge of the temperature of the adjacent air in the adjacent air channel.

Referring again to FIG. 10, the invention contemplates that a complex schedule for multiple foods cooked at different temperatures having different schedules 76 may be entered into the control program 51 at process block 118. In this case, the program 51 may have an overview of the entire cooking process for improved cooking control. The program 51 may make use of the same compatibility rules described above and knowledge of the cooking times to completely schedule start times and cavity locations of foods to provide both compatibility of cooking temperatures and simultaneous or scheduled completion of each food item. Because the scheduled start times of the cooking of each food item is known, more sophisticated matching of cavities to recipes may be performed by looking, not at peak or average cooking temperatures over the entire cooking process but rather only peak or average cooking temperatures during the period of overlap of cooking between the two cavities.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" or "the microcontroller" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include

What we claim is:

1. A multi-cavity oven comprising:
   a housing defining an interior cooking volume surrounded by insulated outer walls and at least one door that may open and close to provide access to the interior cooking volume; and
   a set of shelves subdividing the cooking volume into cooking cavities, the shelves providing separate upper and lower air channels divided by at least one interior barrier wall, each leading from respective air inlets to respective upwardly directed airstream openings and downwardly directed airstream openings through a jet plate;
   wherein each cavity provides a separate blower circulating air from the cavity into a lower air channel of a shelf above the cavity and an upper air channel of the shelf below the cavity;
   wherein each cavity provides a separate heater and a thermal sensor; and
   further including a controller receiving a control set point and a signal from the thermal sensor to control the heater
   wherein the barrier wall and jet plate intercommunicate mechanically to resist warpage of each shelf with variations in thermal expansion of the barrier wall and jet plate; and
   wherein the upper and lower air channels of each shelf are separated by a thermal resistance having an R-value of less than one.

2. The multi-cavity oven of claim 1 wherein the shelves have a vertical thickness of less than three inches measured between an uppermost extent of airstream openings of the upper air channels and a lowermost extent of airstream openings of the lower air channels.

3. The multi-cavity oven of claim 2 wherein the thickness is no greater than three inches.

4. The multi-cavity oven of claim 1 wherein the upper and lower air channels of each shelf have an average separation of less than one inch.

5. The multi-cavity oven of claim 4 wherein the upper and lower air channels of each shelf have portions within a separation of less than one-half inch.

6. A multi-cavity oven comprising:
   a housing defining an interior cooking volume surrounded by insulated outer walls and at least one door that may open and close to provide access to the interior cooking volume; and
   a set of shelves subdividing the cooking volume into cooking cavities, the shelves providing separate upper and lower air channels divided by at least one interior barrier wall, each leading from respective air inlets to respective upwardly directed airstream openings and downwardly directed airstream openings through a jet plate;
   wherein each cavity provides a separate blower circulating air from the cavity into a lower air channel of a shelf above the cavity and an upper air channel of the shelf below the cavity;
   wherein each cavity provides a separate heater and a thermal sensor; and
   further including a controller receiving a control set point and a signal from the thermal sensor to control the heater;
   wherein the barrier wall and jet plate intercommunicate mechanically to resist warpage of each shelf with variations in thermal expansion of the barrier wall and jet plate; and
   wherein the upper and lower channels of each shelf are separated by a thermal resistance having an R-value less than half of the R-value in the outer walls of the oven.

7. The multi-cavity oven of claim 6 wherein the outer walls of the oven have an R-value of no less than three.

8. The multi-cavity oven of claim 1 wherein the controller operates to control an airspeed through the channel to prevent an air temperature gain or loss from air passing through the channel from the inlet to the airstream opening causing thermal transfer with an adjacent air channel of greater than five degrees Fahrenheit.

9. The multi-cavity oven of claim 1 wherein the shelves are replaceably removable from the interior cooking volume.

10. The multi-cavity oven of claim 9 wherein the shelves consist of a separately removable lower plenum providing lower air channels and a separately removable upper plenum providing upper air channels, at least one plenum providing a barrier wall separating the upper and lower air channels.

11. The multi-cavity oven of claim 10 wherein the interior cooking volume provides inwardly extending shelf supports supporting the lower plenum and the upper plenum resting directly on the lower plenum to be supported thereby.

12. The multi-cavity oven of claim 10 wherein each plenum provides an air distribution plate defining the airstream openings and an opposed barrier wall, the barrier wall together with the air distribution plate defining the channel and wherein the air distribution plate and barrier wall are user-separable components.

13. The multi-cavity oven of claim 10 wherein the upper and lower plenums provide different air distribution plates providing a different configuration of openings.

14. The multi-cavity oven of claim 10 further including a single plenum at the top and bottom of the interior cooking volume providing an upper surface of an uppermost cavity and a lower surface of a lowermost cavity.

15. The multi-cavity oven of claim 1 further including a manifold communicating between each blower and two channels to provide greater airflow through an upper channel of the lower plenum than to a corresponding lower channel of the upper plenum flanking a cavity.

16. The multi-cavity oven of claim 1 further including at least one rack positionable on an upper surface of at least one shelf, the at least one rack supported by the shelf to be stationary with respect to the shelf in spaced relationship from the upwardly directed airstream openings.

17. The multi-cavity oven of claim 1 wherein the thermal sensor is positioned in a wall of the oven communicating with the cavity through intake apertures to be upstream from the heater of the cavity and downstream from the airstream openings.

18. The multi-cavity oven of claim 1 further including a compliant seal positioned between an inner surface of the at least one door and a front edge of the shelf to block airflow past the shelf between adjacent cavities.

19. The multi-cavity oven of claim 1 wherein an upper wall of the lower air channel of each shelf slopes downwardly from the air inlet, and a lower wall of the upper air channel of each shelf slopes upwardly from the air inlet to provide an increasing air gap between the upper and lower channels possible with reduced airflow through the channels as one moves away from the air inlets.

20. The multi-cavity oven of claim 1 wherein the controller communicates with a display guiding a user in loading of food into cavities currently not used for cooking food based on temperatures of cavities currently used for cooking food.

21. The multi-cavity oven of claim 1 including at least three cavities and wherein a separation between the upper wall of the interior cooking volume and a lower wall of the interior cooking volume is less than twenty-five inches.

22. The multi-cavity oven of claim 21 wherein each cooking cavity is at least five inches in height between a lower surface of the airstream openings of the upper shelf and an upper surface of the airstream openings of the lower shelf.

23. A multi-cavity oven comprising:
a housing defining an interior cooking volume surrounded by insulated outer walls and at least one door that may open and close to provide access to the interior cooking volume; and
a set of shelves subdividing the cooking volume into cooking cavities, the shelves providing separate upper and lower air channels divided by at least one interior barrier wall, each air channel leading from respective air inlets to respective upwardly directed airstream openings and downwardly directed airstream openings through a jet plate;
wherein each cavity provides a separate blower circulating air from the cavity into a lower air channel of a shelf above the cavity and an upper air channel of the shelf below the cavity;
wherein each cavity provides a separate heater and a thermal sensor placed in the circulated air after the airstream openings
further including a controller receiving a control set point and a signal from the thermal sensor to control the heater;
wherein the barrier wall and jet plate intercommunicate mechanically through a floating mounting adapted to resist warpage of each shelf with variations in thermal expansion of the barrier wall and jet plate.

24. The multi-cavity oven of claim 23 wherein the shelves are replaceably removable from the interior cooking volume.

25. The multi-cavity oven of claim 24 wherein the shelves consist of a separately removable lower plenum providing lower air channels and an upper plenum providing upper air channels, at least one plenum providing the barrier wall separating the upper and lower air channels.

26. The multi-cavity oven of claim 25 wherein an upper wall of the lower air channel of each shelf slopes downwardly from the air inlet, and a lower wall of the upper air channel of each shelf slopes upwardly from the air inlet to provide an increasing air gap between the upper and lower channels as one moves away from the air inlets.

27. The multi-cavity oven of claim 25 wherein the interior cooking volume provides shelf supports supporting surfaces, the lower plenum and the upper plenum resting directly on the lower plenum to be supported thereby.

* * * * *